United States Patent
Schämann

(10) Patent No.: US 9,127,777 B2
(45) Date of Patent: Sep. 8, 2015

(54) REVERSING VALVE FOR A HIGH-VISCOSITY MEDIUM

(75) Inventor: Rolf Schämann, Münster (DE)

(73) Assignee: Nordson Holdings S.A.R.L. & Co. KG (DE)

( * ) Notice: Subject to any disclaimer, the term of this patent is extended or adjusted under 35 U.S.C. 154(b) by 517 days.

(21) Appl. No.: 13/258,071

(22) PCT Filed: Mar. 19, 2010

(86) PCT No.: PCT/EP2010/053641
§ 371 (c)(1),
(2), (4) Date: Oct. 10, 2011

(87) PCT Pub. No.: WO2010/108871
PCT Pub. Date: Sep. 30, 2010

(65) Prior Publication Data
US 2012/0097278 A1    Apr. 26, 2012

(30) Foreign Application Priority Data
Mar. 23, 2009  (DE) .................. 10 2009 014 029

(51) Int. Cl.
*F16K 11/07* (2006.01)
*B29C 47/52* (2006.01)
*B29B 7/80* (2006.01)

(52) U.S. Cl.
CPC .............. *F16K 11/07* (2013.01); *B29B 7/801* (2013.01); *B29C 47/525* (2013.01); *Y10T 137/86879* (2015.04)

(58) Field of Classification Search
CPC .............................. F16K 11/07; F16K 11/0708
USPC ............................ 137/625.3, 625.37, 625.48
See application file for complete search history.

(56) References Cited

U.S. PATENT DOCUMENTS

| 2,485,504 | A | * | 10/1949 | Morgan ..................... 251/324 |
| 3,833,121 | A |   | 9/1974 | Singleton et al. |
| 3,882,883 | A | * | 5/1975 | Droegemueller ............. 137/270 |
| 3,989,058 | A | * | 11/1976 | Jackson et al. ................ 137/269 |
| 4,066,239 | A | * | 1/1978 | Hall ............................... 251/31 |
| 4,226,543 | A | * | 10/1980 | Schluter .................... 366/159.1 |

(Continued)

FOREIGN PATENT DOCUMENTS

| CN | 1359326 A | 7/2002 |
| CN | 2549268 Y | 5/2003 |

(Continued)

*Primary Examiner* — John Fox
(74) *Attorney, Agent, or Firm* — Fredrikson & Byron, P.A.

(57) ABSTRACT

A reversing valve (100) for a high-viscosity medium comprises a housing (10) having an inlet opening (23) and at least two outlet openings (21, 22), extending into a valve bore in which is mounted an axially displaceable valve stem (10, 10'). The valve stem comprises a groove by which the inlet opening (23) is alternatively to be connected to one of the outlet openings (21, 22). The groove has an axially extending inflow zone (12) and an axially extending outflow zone (11, 11'). The inflow and outflow zones are connected at both ends to a continuous annular channel by way of connecting channels (13, 14).

12 Claims, 4 Drawing Sheets

(56) References Cited

U.S. PATENT DOCUMENTS

| | | | |
|---|---|---|---|
| 4,234,015 A * | 11/1980 | Kintner | 137/625.18 |
| 4,319,608 A * | 3/1982 | Raikov et al. | 137/625.48 |
| 4,323,087 A | 4/1982 | Brunner | |
| 4,566,479 A | 1/1986 | Rotte et al. | |
| 4,750,511 A * | 6/1988 | Henry et al. | 137/14 |
| 5,458,684 A * | 10/1995 | Miller et al. | 118/602 |
| 5,524,821 A * | 6/1996 | Yie et al. | 239/10 |
| 6,408,882 B1 * | 6/2002 | Smith, Jr. | 137/625.34 |
| 6,763,852 B1 | 7/2004 | Finkeldei et al. | |
| 7,422,033 B2 | 9/2008 | Barber | |
| 8,104,258 B1 * | 1/2012 | Jansen et al. | 60/39.281 |

FOREIGN PATENT DOCUMENTS

| | | |
|---|---|---|
| DE | 2904034 A1 | 8/1980 |
| DE | 2907565 A1 | 8/1980 |
| DE | 2264775 C3 | 6/1981 |
| DE | 3004732 A1 | 8/1981 |
| DE | 3309065 C2 | 12/1988 |
| DE | 102005058673 A1 | 7/2006 |
| EP | 1596039 A2 | 11/2005 |
| GB | 1215621 | 12/1970 |
| GB | 1215621 A | 12/1970 |
| WO | 2008111863 A1 | 9/2008 |

* cited by examiner

REVERSING VALVE FOR A HIGH-VISCOSITY MEDIUM

BACKGROUND OF THE INVENTION

The invention relates to a reversing valve for a high-viscosity medium, in particular for a plastic melt, comprising at least one housing, having at least one inlet opening and at least two outlet openings. The openings extend into a valve bore in which a valve stem is supported, the valve stem having a recess by which the inlet opening is to be connected alternately with one of the outlet openings.

Such valves are required in systems for the preparation and filtering of plastic melts that are supplied to plastic processing machines. Known are 3/2-way valves designed as rotary valves. The valve stem in this type of valve exhibits a groove at its circumference. The valve stem can be rotated such that:

(a) a flow path is formed between an inlet opening and a first outlet opening via its groove;

(b) a flow path is formed between an inlet opening and a second outlet opening via its groove; and (c) the inlet opening is closed and all flow paths are interrupted via another surface section on the valve stem into which the groove extends.

It is also known to provide a little longer groove than the length of the wall section between the outlet openings. This results in a transitional position of the valve stem with a respective small opening gap between the groove and the two outlet openings to allow for a pre-flooding of the two paths conducting the melt with a significantly lowered flow rate.

Because of the flow through the groove in all possible positions, no dead zones remain where chemical and thermal degradation of plastics could occur due to long residence times and heating.

However, sealing has proven to be problematic in practical applications. In order avoid leakage flows and at the same time ensure free rotatability, the gap between the valve stem and the housing must be formed very precisely, which is practically achievable only with conical valve stems and conical valve bores. Manufacturing the conical geometries and adhering to the same cone angle for both components requires considerable effort in manufacturing technology.

During operation, the conical valve stem is pre-tensioned to ensure leak-tightness.

An additional disadvantage of the known reversing valve is that the inlet and outlet openings must run radially towards the valve bores. It is therefore not possible to position the two outlet openings without additional reversing members on a common area next to each other.

SUMMARY OF THE INVENTION

A principal objective of the present invention is to provide a reversing valve that is simple to manufacture and allows adjacent outlet openings.

This objective, as well as other objectives which will become apparent from the discussion that follows, are achieved, in accordance with the present invention by arranging the valve stem in the valve bore in an axially moveable manner with the valve stem exhibiting an axially extending, groove-shaped inflow zone and an axially extending, groove-shaped outflow zone such that the inflow zone is connectable with the inlet opening inside the housing and the outflow zone is connectable with at least one of the outlet openings in the housing. The inflow and outflow zones are respectively connected at both ends via connecting channels by forming a continuous annular channel.

The forces needed for an axial movement of the valve stem can be generated easily by a hydraulic cylinder or the like and, with comparable diameter ratios, stress the material of the valve stem less than in the case of the torsion of a rotational valve stem which is additionally weakened in its cross-section by a groove. This allows for the selection of tight tolerances between valve stem and valve bore that ensure a sufficient seal when high-viscosity media such as plastic melts flow through. The cylindrical shape of valve bore and stem significantly simplifies the manufacturing process.

Essential to the invention is the annular groove on the valve stem together with the axial inflow and outflow zones.

The term "annular" as used in this context characterizes, in particular, the continuous form of the groove. However, a circular form is not required.

Also in the context of the present invention, the term "axial means that, in a cylindrical coordinate system, the largest dimension of the groove extends in the same direction as the central axis. A straight shape of the inflow and outflow zones and their orientation parallel to the axis does correspond to the preferred embodiment, because it is easy to manufacture. However, it is also possible that the grooves are curved and/or are aligned askew in relation to the longitudinal cylinder axis.

By feeding the medium into the closed annular structure in the inflow zone, it is split into two partial streams, which flow towards the outflow zone in opposite orientation—one clockwise, the other counterclockwise—and via the outflow zone discharge into one of the outlet openings. Thus, the flow occurs in both partial flow paths in both operating positions, and there is no lengthy residence time of material residue in partial areas of the flow paths.

Preferably, the annular groove is formed such that two hydraulically equal flow paths are created in both operating positions. Thus the length and/or flow resistance lead to equal flow rates in the partial channels and connecting channel sections.

In a preferred embodiment of the invention, a symmetrical annular groove provides at the same axial position, on the valve stem, inflow and outflow zones of equal lengths, which in turn are connected on both sides via connecting channels of equal lengths. The cross-sections of the inflow and outflow zones, such as the ones of the connecting channels, are also equal, at least in pairs.

In one variant of the invention, the connecting channels are formed as grooves, each extending between the inlet and the outflow zones along the cylindrical surface.

In another variant, bores are provided as connecting channels, which extend radially or in the direction of a secant at the cylindrical valve stem and through which the end regions of the inlet and the outflow zones are connected to each other.

This symmetrical flow path separation is possible independent of the position of the inflow and outflow zones, which are oriented parallel at the cylinder surface of the valve stem.

Possible are both a standard embodiment, in which the inflow and outflow zones are located diametrically opposite to one another such that one inlet and one outlet opening are located opposite to each other, as well as a customized application in which in a cross-sectional view the radial center lines of the inflow zone and the outflow zone form an angle of less than 180°.

In the operating positions, the cross-section of the inflow zone fully covers the inlet opening and the outflow zone fully covers one of the outlet openings. The other outlet opening is then fully covered by the cylinder surface of the valve stem and is fully blocked by it.

In order to achieve a gradual filling of a downstream unit upon start-up, or to displace air from units upstream of the reversing valve, an additional maintenance position of the reversing valve may be provided in which the outflow zone covers the outlet hole only slightly, such that a strong flow barrier is formed for the melt and thus a slow filling of downstream units such as filters pots with melt is possible. To this end, the outflow zone should preferably be longer than an interior wall section of the valve bore, by which the adjacent exit openings are separated from one another.

This means that the outflow zone is positioned such that it extends straight on the right and left into the inside diameter of the outlet openings.

The axial travel path of the valve stem should correspond to the length of the inflow zone minus the diameter of the inlet opening and the distance between the outer boundary edges of the outlet openings to the travel path plus the length of the outflow zone. With this geometry, flush transitions from the outflow zone into the respective outlet opening exist at the outsides in all operating positions.

For a full understanding of the present invention, reference should now be made to the following detailed description of the preferred embodiments of the invention as illustrated in the accompanying drawings.

BRIEF DESCRIPTION OF THE PREFERRED EMBODIMENTS

DESCRIPTION OF THE PREFERRED EMBODIMENTS

Figure 1:
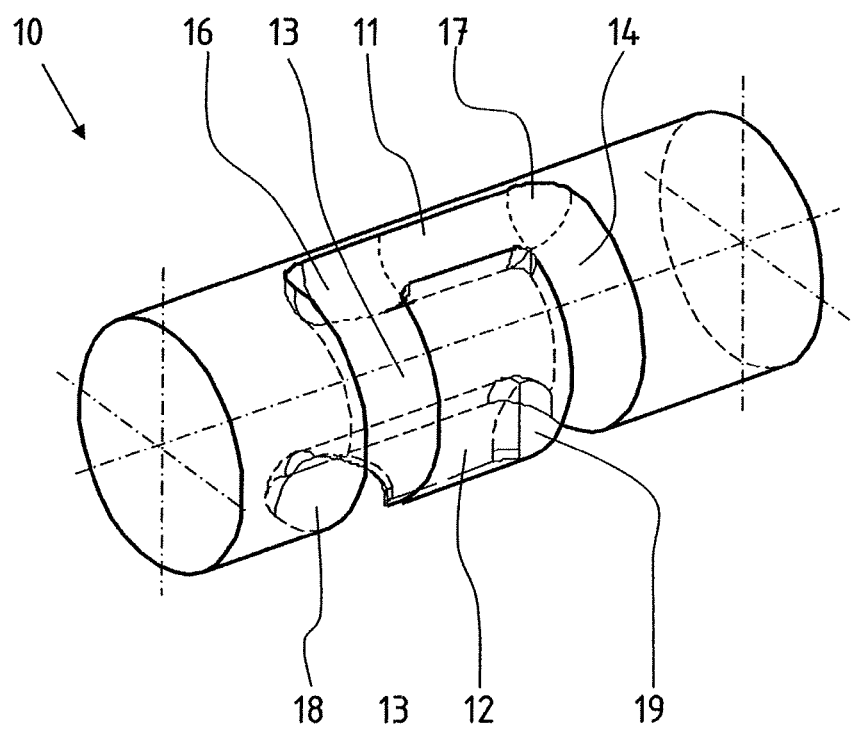
FIG. 1 is a perspective view of a valve stem of a reversing valve according to a first embodiment.

The preferred embodiments of the present invention will now be described with reference to FIGS. 1-6 of the drawings. Identical elements in the various figures are designated with the same reference numerals.

FIG. 1 shows a valve stem 10 for a reversing valve with an annular grove introduced into the outer surface side thereof. The annular groove is comprised of two axially parallel grooves as inflow zone 12 or outflow zone 11, respectively, and connecting channels 13, 14. In this illustrated embodiment of the valve stem 10, the connecting channels 13, 14 are designed as curved grooves, which extend along a circular line across the cylinder surface. In corner areas 16, 17, 18, 19, the redirection of the melt occurs at an angle of 90° or into the outlet openings 21, 22.

The design of the annular groove is generally symmetrical such that a reverse flow, where the inflow and outflow zones are reversed, is possible as well.

Figure 2:
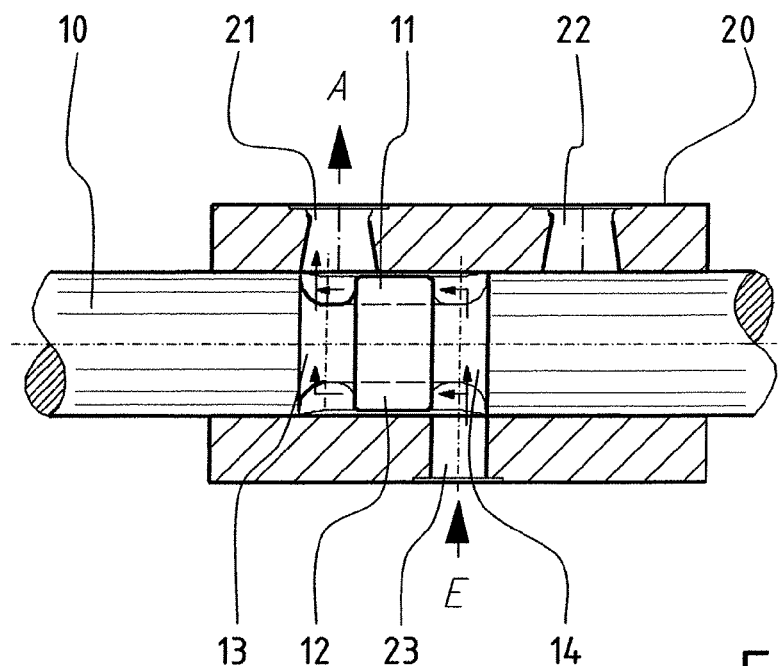
FIGS. 2 and 3 are cross-sectional views of the reversing valve in the two operating positions.
Figure 3:
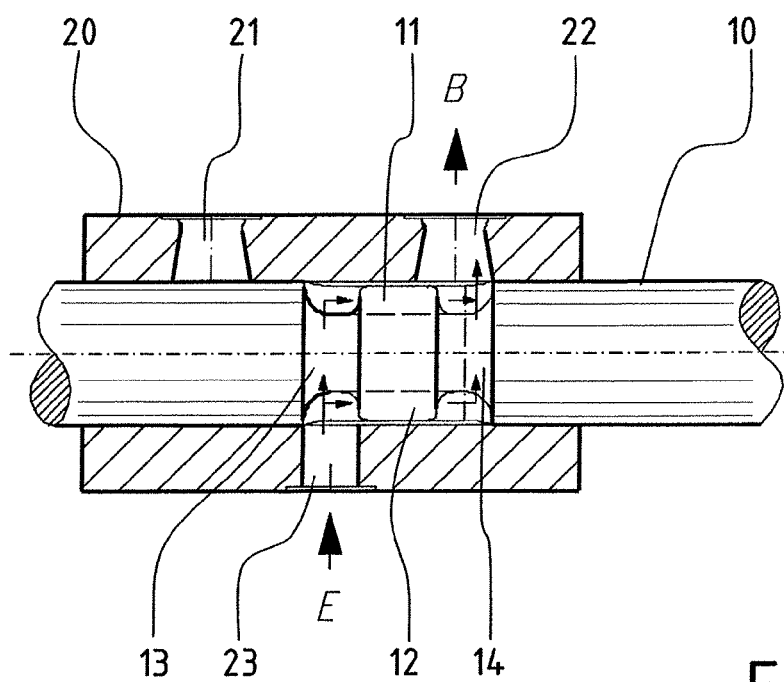

The manner in which the flow paths are divided evenly become apparent in the cross-sectional views of a reversing valve 100 in FIGS. 2, 3, where the respective valve stem 10 is inserted into a valve housing 20 with a valve bore.

Located at the bottom is an inlet opening 23 that extends between an outer side of the housing 20 and the valve bore. Provided at the upper side are two adjacent outlet openings 21, 22.

In FIG. 2, the valve stem 10 is moved to the left. An entering melt inflow E passes through the inlet opening 23 into the inflow zone 12 of the valve stem 10. As indicated by the arrows, a portion of the flow flows along the inflow zone 12 to the left, from there into the connecting channel 13 and then through the outflow zone 11 into the left outlet opening 21 as the outflowing melt flow A. A second portion of the flow passes first through the connecting channel 14 and then along the inflow zone 12 to the left, all the way into the outlet opening 21. The partial flows, separated inside the reversing valve, merge again at the latest at the outlet opening 21.

The width of the connecting channel 14 matches the width of the diameter of the inlet opening 23, and the expansion of the inflow zone 12 to the right ends here, such that a smooth transition is established. In the area of the outlet opening, the left connecting channel 13, the left end of the outflow zone and the left wall portion of the outlet opening 21 merge into each other.

In FIG. 3, the valve stem 10 has been moved to the right, namely by a distance corresponding to the length of the inflow zone minus the diameter of the inlet opening.

The course of the partial flows in FIG. 3 is exactly opposite to that in FIG. 2.

A first partial flow is clockwise: initially through the connecting channel 13 and then through the outflow zone 11 to the right outlet opening 22.

A second partial flow runs along the inflow zone 12 to the right and then via the right connecting channel 14 into the upper outflow zone 11 and across it into the outlet opening 22. A melt flow B exits there.

Figure 4:
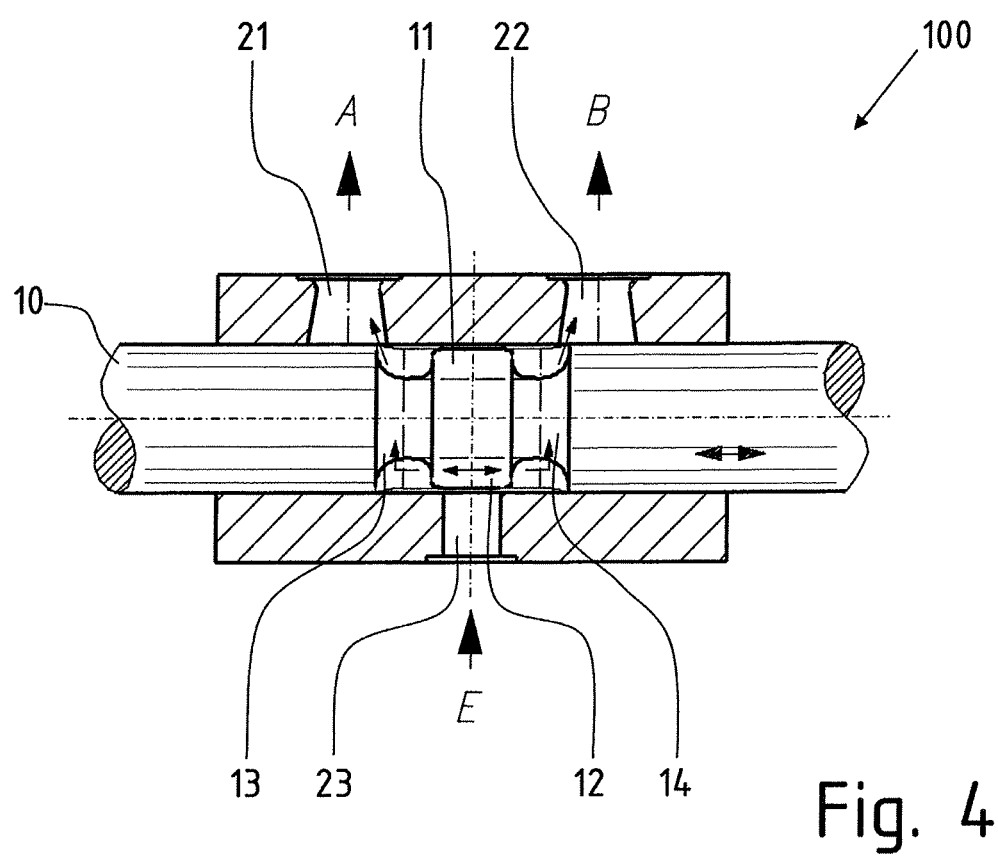
FIG. 4 is a cross-sectional view of the reversing valve in a maintenance position.
Figure 5:
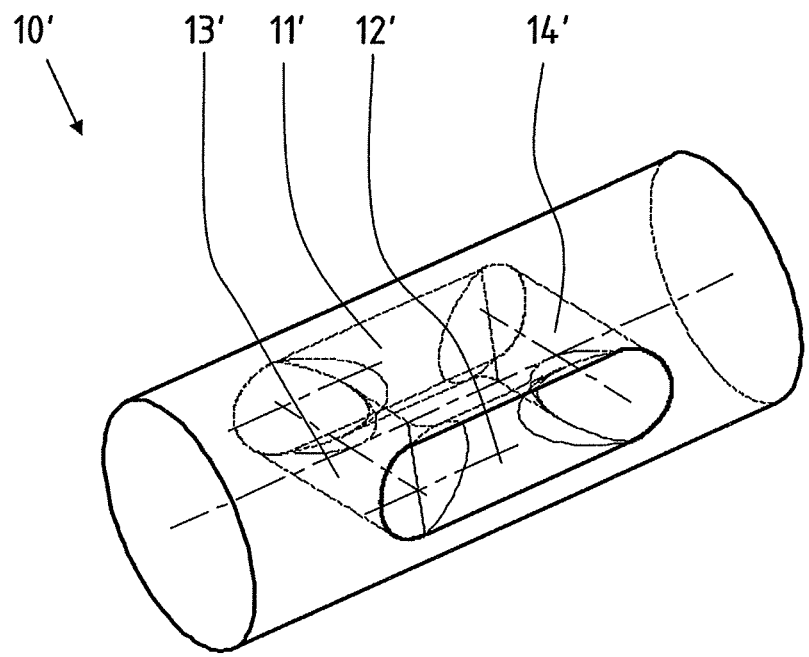
FIG. 5 is a perspective view of a valve stem according to a second embodiment.

FIG. 4 shows the maintenance position. A central flow flows from the inlet opening 21 onto the inflow zone 12, such that the flow is distributed evenly into a left and a right leg. The outflow zone 11 is positioned such that it barely covers the outlet openings 21, 22 at the respective edges. This at least allows air to escape freely. For the viscous medium, however, there is strong obstacle to the flow at these crossing points, such that a stagnation pressure builds up in front of the reversing valve 100, which promotes the flooding of a downstream system with melt.

Figure 6:
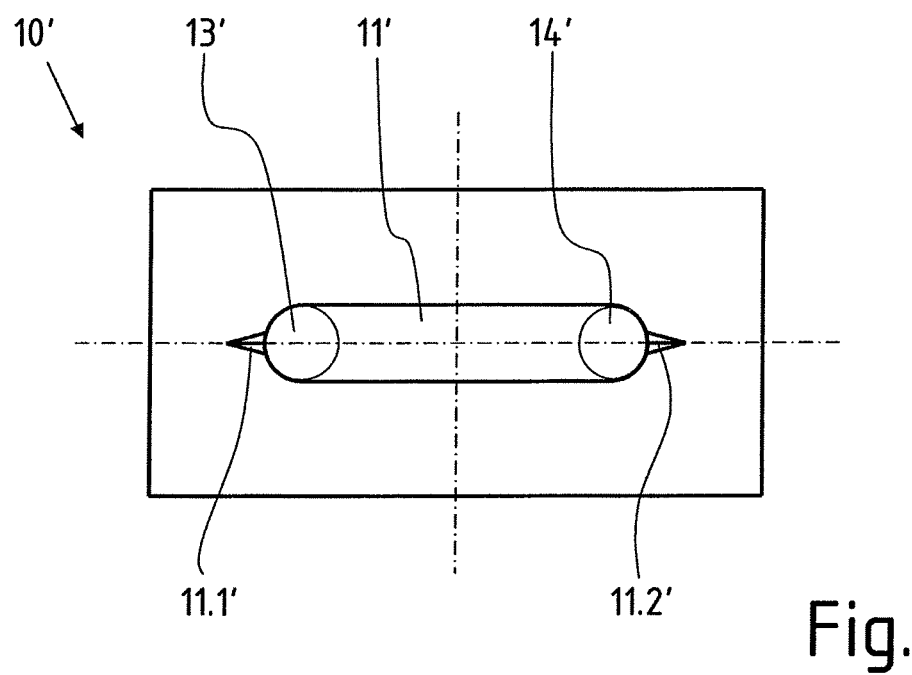
FIG. 6 is a top view of a detail of an outflow zone at the valve stem.

FIG. 6 shows a possible detail of the edge area of the outflow zone 11'. Arrow-shaped grooves 11.1', 11.2° with a triangular shape in the cross-section and longitudinal section, i.e., they have the shape of the bow of a ship. The distance between the outlet openings and the cross section at the valve bore is chosen such that in a maintenance position of the valve stem similar to FIG. 4, only the arrow-shaped extensions 11.1', 11.2° reach into the outlet openings 21, 22. This results in a very small opening, which significantly reduces the outgoing volume flow of the high-viscosity medium. The flow rate is reduced to such a degree that downstream components are slowly filled with melt, or that a very low flow rate through the reversing value according to the invention is maintained in order to avoid too long a residence time of the melt in the valve, e.g., during production breaks.

There has thus been shown and described a novel reversing valve for a reversing valve for a high-viscosity medium which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A reversing valve for a high-viscosity medium having operating positions and a maintenance position, said reversing valve comprising:
    (a) a housing having an inlet opening, two outlet openings, and a valve bore, said openings extending to said valve bore and being separated by an interior wall section of said valve bore; and
    (b) a valve stem disposed in said valve bore in a displaceable manner and having a recess, in the operating positions said recess connects said inlet opening alternately with one of said outlet openings, said valve stem elongated in an axial direction and having a cylindrical shape with a longitudinal cylinder axis and a cylinder outer surface; said recess having an inflow zone and an outflow zone, said inflow zone having a first end, a second end and a groove elongated in the axial direction and extending from said first end of said inflow zone to said second end of said inflow zone, said outflow zone having a first end, a second end and a groove elongated in the axial direction and extending from said first end of said outflow zone to said second end of said outflow zone;
    said recess further comprising a first connecting channel and a second connecting channel, said first end of said inflow zone connected to said first end of said outflow zone by said first connecting channel, and said second end of said inflow zone connected to said second end of said outflow zone by said second connecting channel, said inflow and outflow zones and said connecting channels collectively forming a continuous channel; and,
    said outflow zone being larger than said interior wall section, in the maintenance position said outflow zone connects said inlet opening with both of said outlet openings.

2. A reversing valve as set forth in claim 1, wherein said inflow and outflow zones and said connecting channels are each formed equally in pairs.

3. A reversing valve as set forth in claim 1, wherein said continuous channel, in the operating positions when a connection is established between said inlet opening and one of said outlet openings, said continuous channel forms two hydraulically equal flow paths between said inlet opening and said connected outlet opening.

4. A reversing valve as set forth in claim 1, wherein said connecting channels are radial bores.

5. A reversing valve as set forth in claim 1, wherein said connecting channels are formed as curved grooves, that extend on said cylinder outer surface of said valve stem from one end of said inflow zone to a respective end of said outflow zone.

6. A reversing valve as set forth in claim 1, wherein said inflow and outflow zones are located diametrically opposite to each other on said cylinder outer surface of said valve stem.

7. A reversing valve as set forth in claim 1, wherein said inflow zone has a length, said inlet opening has a diameter, and said valve stem has an axial travel path corresponding to said length of said inflow zone minus said diameter of said inlet opening.

8. A reversing valve as set forth in claim 7, wherein said outlet openings have outer boundary edges separated by a distance corresponding to said axial travel path of said valve stem plus said length of said outflow zone.

9. A reversing valve as set forth in claim 1, wherein said connecting channels are separate and distinct from each other.

10. A reversing valve as set forth in claim 1, wherein said grooves of said inflow and outflow zones each have a straight shape that is parallel to the longitudinal cylinder axis.

11. A reversing valve as set forth in claim 1, wherein said grooves of said inflow and outflow zones are formed on said cylinder outer surface of said valve stem.

12. A reversing valve as set forth in claim 1, wherein said continuous channel is a continuous annular channel.

* * * * *